United States Patent [19]

Harman

[11] Patent Number: 5,239,599
[45] Date of Patent: Aug. 24, 1993

[54] MOVING FIBER OPTICAL FIBER SWITCH

[75] Inventor: Murray R. Harman, Gloucester, Canada

[73] Assignee: JDS Fitel Inc., Nepean, Canada

[21] Appl. No.: 929,131

[22] Filed: Aug. 13, 1992

[51] Int. Cl.[5] .................... G02B 6/26; G02B 26/00
[52] U.S. Cl. ..................................... 385/16; 385/23
[58] Field of Search .................. 385/15, 16, 17, 20, 385/22, 23, 25, 52, 57

[56] References Cited

U.S. PATENT DOCUMENTS

| | | | |
|---|---|---|---|
| 4,407,562 | 10/1983 | Young | 385/23 |
| 4,699,457 | 10/1987 | Goodman | 385/22 |
| 4,946,247 | 8/1990 | Muska et al. | 385/16 |
| 5,000,532 | 3/1991 | Kraetsch et al. | 385/16 |

Primary Examiner—Frank Gonzalez
Attorney, Agent, or Firm—Sidney T. Jelly

[57] ABSTRACT

A moving fiber optical fiber switch is formed by mounting one or more optical fibers on support surfaces of two spaced support members, one or both of which are laterally movable. After mounting of the fiber or fibers, a transverse fine cut across the fiber or fibers produces a conventional gap, but providing extremely accurate positioning. A pivot member moved by a coil mounted on a lever extension, in conjunction with magnets, moves one or both support members via rods or similar members extending between the pivot member and the support members, one on each side of the pivot axis of the pivot member. Adjustment means coactive with the free end of the lever provides easy and accurate control of the pivoting of the pivot member and of the support members and fibers. A large lever differential obtained by the lever provides for the ease and accuracy of control.

19 Claims, 4 Drawing Sheets

MOVING FIBER OPTICAL FIBER SWITCH

This invention relates to a moving fiber optical switch, and in particular to a switch with a high level of mechanical and optical accuracy. The invention also relates to a method of making such a switch.

Switches are required in fiber optic systems, for example to redirect light from one fiber to another. There are two main types of switch, electro-optic (non-moving); and electromechanical.

In the manufacture of either type one of the fundamental limitations is the level of accuracy required in handling and positioning of fibers and their respective light guiding components. This is particularly so in the case of single mode fiber, as the light carrying core is usually less than ten microns in diameter. To obtain the necessary very low alignment losses, extremely high levels of axial alignment are essential. With the difficulty of obtaining the necessary high level of axial alignment with the small diameter light carrying cores of single mode fibers, the majority of moving fiber switches are provided for multi-mode fibers, having a larger light carrying core.

A further complication is that the switches can be very sensitive to temperature variations and external stresses. The switch mechanisms are large relative to the fiber dimensions, and usually require special mounting arrangements.

The present invention provides an optical fiber switch having a pair of opposed fibers with a gap therebetween, in which the switching action is obtained by moving a fiber laterally, with an extremely high level of repeatability. The relative positioning of the fibers is obtained in a very simple but unique way. The fiber movement is very easily and closely controlled, and adjusted. In a preferred example, opposed fibers are moved differentially. The fibers are moved by a lever arm drive, providing a large movement at an adjustment position to provide a small movement at the fiber. The gap can extend at an angle to the axes of the fibers to provide low back reflection.

Broadly, there is provided, a moving fiber optical fiber switch comprising: two opposed fiber support members spaced apart along a fiber axis, at least one of said support members flexibly mounted for movement normal to said fiber axis, said support members having support surfaces in a common plane; at least one optical fiber extending across said support members substantially parallel to said fiber axis, said fiber having closely spaced opposed end surfaces forming a gap produced by cutting said fiber; a pivot member mounted for rotation about a pivot axis spaced from and aligned with said gap; means extending from said pivot member to said flexibly mounted support member to move said flexibly mounted support member relative to said other support member; a lever extending from said pivot member and having a free end, and a coil mounted on said lever; magnet means mounted on at least one side of said coil and electrical connections to said coil for providing electrical power to said coil; adjustment means on opposite sides of said free end of said lever; the lever arm from said adjustment means to said pivot axis a number of times longer than the lever arm from said pivot axis to said means extending from said pivot member; the arrangement such that on applying power to said coil, said coil and lever pivot about said pivot axis one way or the other depending upon polarity, and moving said flexibly mounted support member laterally relative to the other support member.

Further, there is provided a method of making a moving fiber optical fiber switch comprising: providing two opposed fiber support members spaced apart along a fiber axis, with at least one support member flexibly mounted for movement normal to said fiber axis, said members having support surfaces in a common plane; positioning at least one fiber on said support surfaces parallel to said fiber axis; mounting a pivotal member for pivotal movement about a pivot axis spaced from said fiber axis and normal thereto, said pivotal member having a lever extending therefrom extending in the direction of said fiber axis; positioning means between said pivotal member and said at least one flexibly mounted support member for movement of said flexibly mounted support member by pivoting of said pivotal member; positioning a coil on said lever and magnet means on at least one side of said coil, whereby on applying power to said coil said lever and said pivotal member pivot about said pivot axis; and cutting across said fiber to form a gap, and said fiber having opposed end surfaces.

The invention will be readily understood by the following description of certain embodiments, by way of example, in which.

Figure 1:
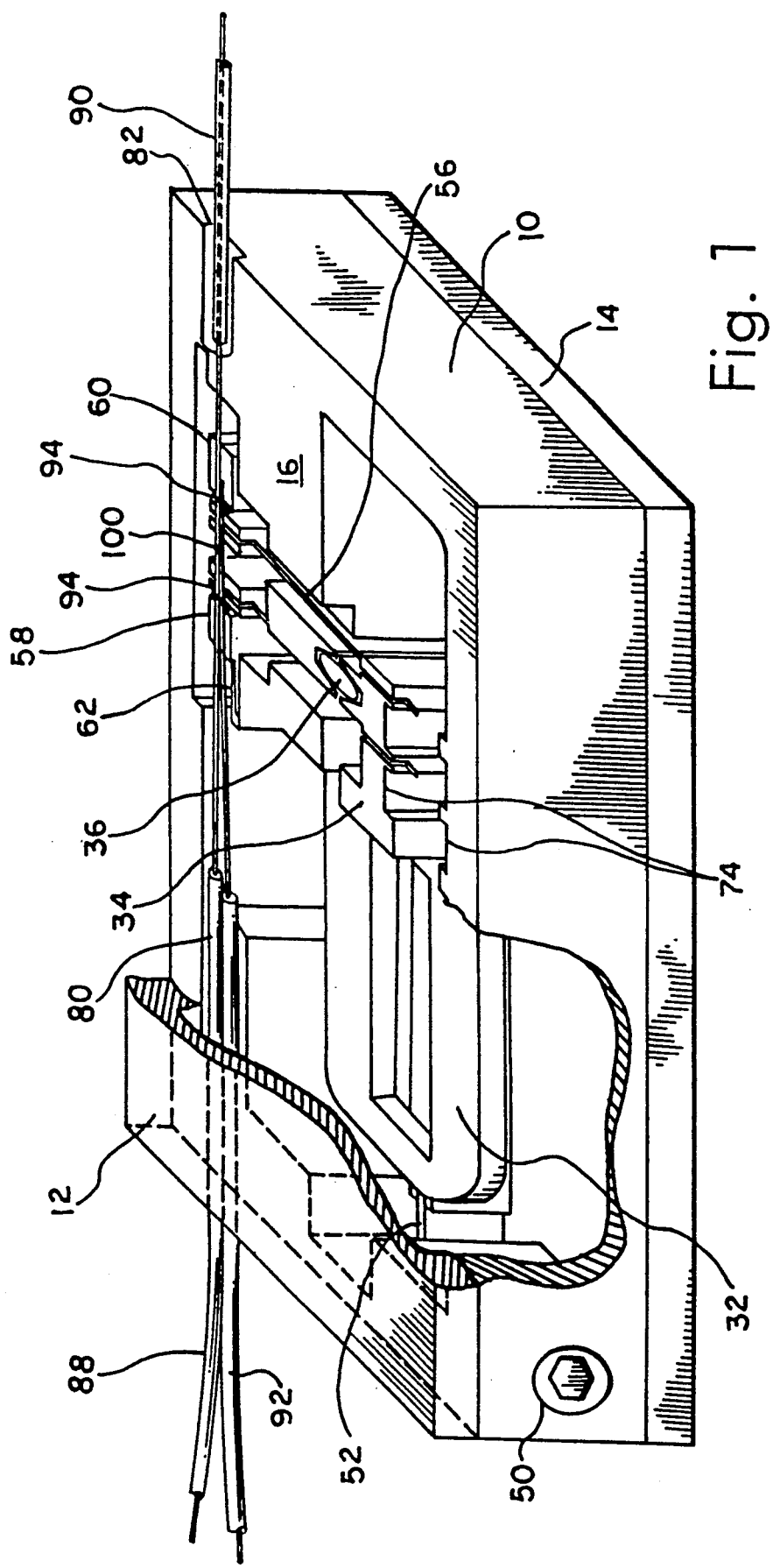
FIG. 1 is a perspective view of one embodiment of a switch assembly, parts in section, with one form of switching facility.
Figure 2:
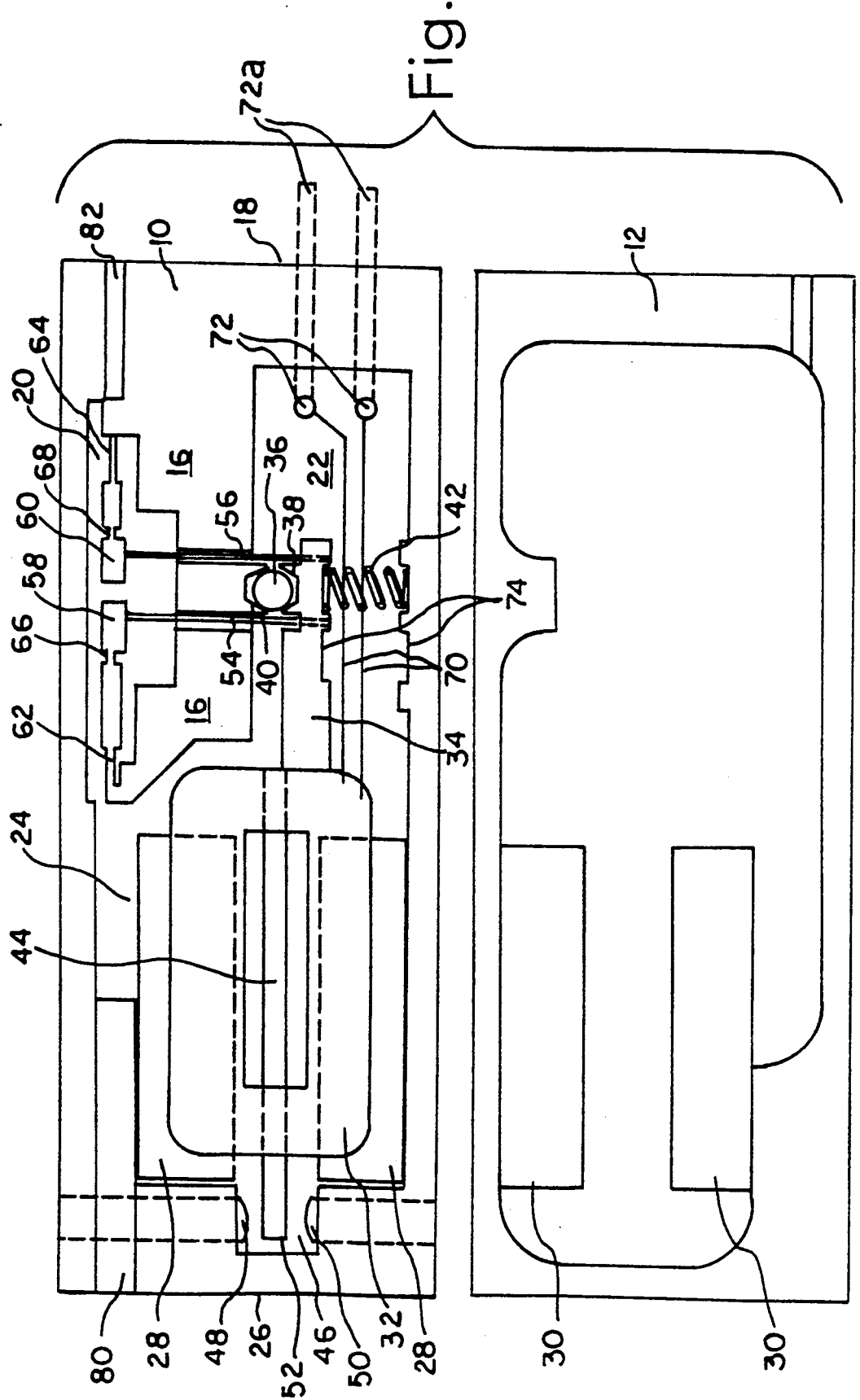
FIG. 2 is a top plan view of the switch of FIG. 1, cover removed and turned over to show detail, and fibers omitted for clarity.

In the particular embodiment illustrated in FIGS. 1 and 2, a switch comprises a housing 10, having a cover 12, and a bottom 14. The housing is hollow, or box-like, with a number of members extending up from the bottom of the housing. A central member 16 extends from one end 18, defining two spaces or chambers 20 and 22, one on each side and adjacent the end 18. The central member 16 extends, in the example, slightly less than half the length of the housing, there being a large space or chamber 24 adjacent the other end 26 of the housing.

Mounted in the larger chamber 24 are two lower magnets 28. Two similar, upper, magnets 30 are mounted in the cover 12. Positioned between the magnets 28 and 30 is a coil 32. Coil 32 is moveable freely, laterally, being mounted on one end of a pivot member 34. Pivot member 34 is pivotally mounted at its other end of a pivot 36, positioned between a pivot formation 38 on the pivot member 34 and a pivot formation 40 on the central member 16. The pivot member 34 is held in position on the pivot 36 and pivot 36 is held in position in formation 40 by a compression spring 42 (or other similar compressible member). The coil 32 is mounted on a lever 44, an extension of the pivot member 34. The lever extends to a recess 46 in the end 26 of the housing. On either side of the recess 46 are positioned adjustment means, in the example screws 48 and 50. The lever 44 has an end portion 52 positioned between the screws, which control the pivotal limits of the lever 44. End portion 52 can be part of the lever 44, or a separate member attached to the lever. Extending from the pivot member 34, one on each side of the pivot 36 are two thin rods 54 and 56. The ends of the rods 54 and 56, remote from the pivot member 34 extend into or are otherwise attached to two fiber support members 58 and 60 respectively. Fiber support members 58 and 60 are hingedly connected to the central member 16 by flexible sections 62, 64 respectively. Two fastening positions 66 and 68 are defined in the fiber support members 58 and 60, for fastening a fiber, or fibers, in position, as will be described later. Electrical conductors 70 connect the coil 32 to terminals 72 in the bottom 14. Alternatively the electrical conductors can connect to terminals in a side wall, as indicated in dotted outline at 72a.

In the example illustrated in FIGS. 1 and 2, with the spring 42 acting on an axis through the pivot, the pivot member is not biased in one direction or the other. If a bias is desired, then the spring can be mounted at alternative positions on the pivot member and the housing, indicated at 74. This would bias the pivot member clockwise, in FIG. 2, with the end 52 normally in contact with the screw stop 48.

In the arrangement illustrated in FIGS. 1 and 2, with no bias applied by the spring, the pivot member 34 is pivoted about pivot 36 by the lever 44 under the action of the coil 32 and the magnets 28 and 30. Application of electrical power, via terminals 72 and connections 74 to the coil 32 will produce pivoting of the lever 44, and the pivot member 34 one way or the other depending upon the polarity direction.

Pivoting of the pivot member pushes one of the rods 54, 56 and pulls on the other. This causes differential movement of the support members 58 and 60. By making the end portion 52 of magnetic material, once the pivot member 34, coil 32 and lever 34 have pivoted, the end portion 52 interacts with the adjacent lower magnet 28, then if the electric power is switched off, and the lever 44 remains biased, with the end portion 52 in contact with a screw. Only a short pulse of the contacts 72 is required to pivot the pivot member, coil and lever, to move the end 52 against the other screw.

In FIG. 2, the optical fibers are omitted to more clearly show the flexible sections 62 and 64, the support members 58 and 60 and the fastening positions 66, 68. Locating channels are formed in the top surface at the main body portion of the housing, at each end, at 80 and 82. The size of the channels can be varied depending upon the number of fibers to be accommodated. In FIG. 2, two fibers are to be accommodated at the left end, in channel 80, and one at the right, at 82.

Figure 3:
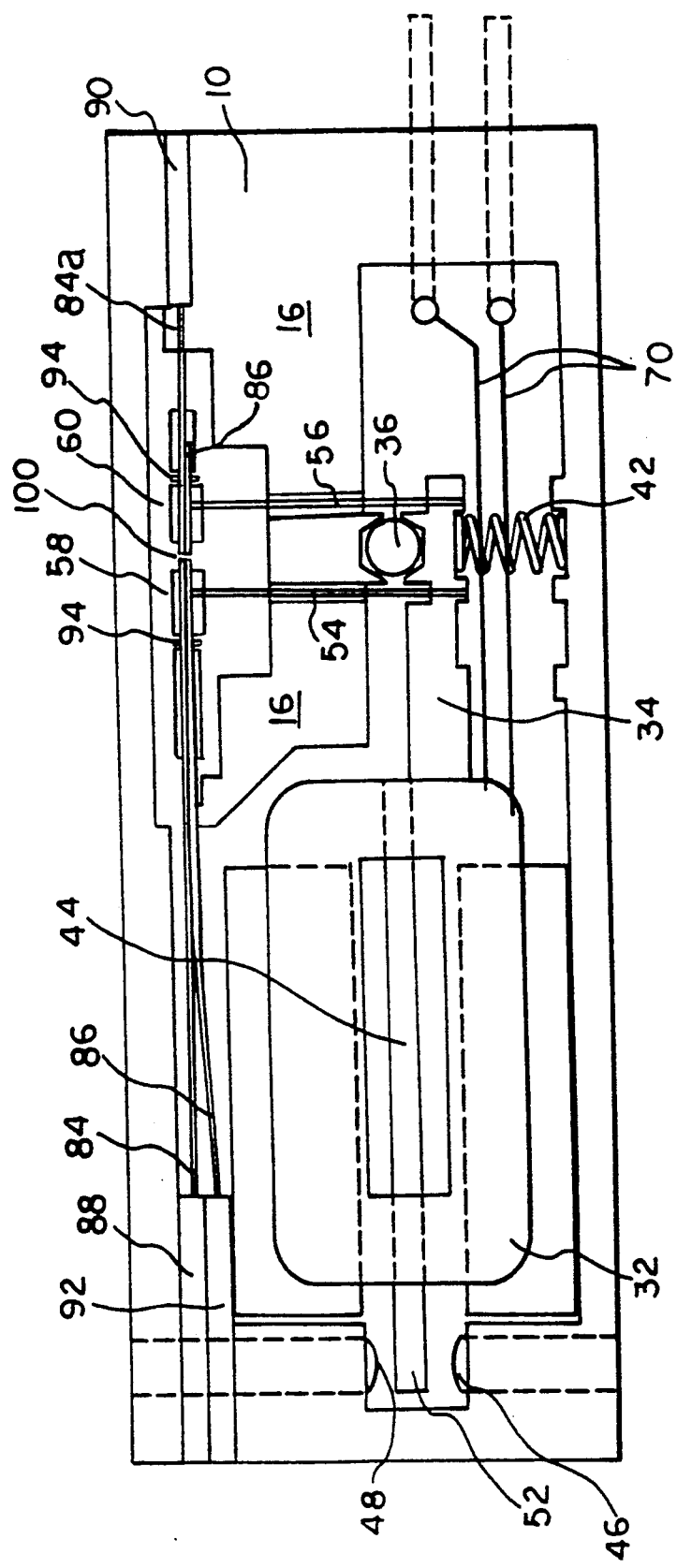
FIG. 3 is a top plan view, as in FIG. 2, cover omitted, with fibers in position.

In FIG. 3, fibers are installed, as in FIG. 1. Two optical fibers 84 and 86 extend across the housing from the left hand end. Initially, fiber 84 extends right across the housing, having portion 84a on the right hand side, with coated portions positioned in the channels 80 and 82, at 88 and 90 repectively. Fiber 86 initially extends only to be positioned on both support members 58 and 60, its coated portion positioned in channel 80, at 92. The fibers are anchored in place by adhesive on the support members, and also inverted U-shaped members are positioned over the fibers at the fastening positions 66 and 68, the U members shown at 94. The members 84 are also held in place by adhesive, as are also the coated portions 88, 90 and 92. The adhesive is shown in FIG. 1. When the fibers are firmly positioned, a gap 100 is formed, as by making a very thin cut through the fibers. By this construction, the opposed fiber ends at the gap are in exact alignment, and yet no high level of positioning is required. In the example of FIGS. 1, 2 and 3, the short length of fiber 86, to the right of the gap 100 in FIG. 3, is not used—it is only part of the positioning arrangement to ensure correct positioning of the fibers. A typical gap dimension is u to about 50 microns.

In the arrangement of FIGS. 1, 2 and 3, the fiber 84a could be an input signal fiber, with the output going either to fiber 84 or 86 depending upon the actuation of the pivot member 34. Movement of the support members by rods 54 and 56 on pivot member 34 causes relative movement at the fiber ends. In one extreme pivotal direction of the pivotal member 34, both positions of fibers 84/84a would be aligned, while at the other extreme pivotal direction of the pivotal member 34 fiber portion 84a would be in alignment with fiber 86.

Figure 4:
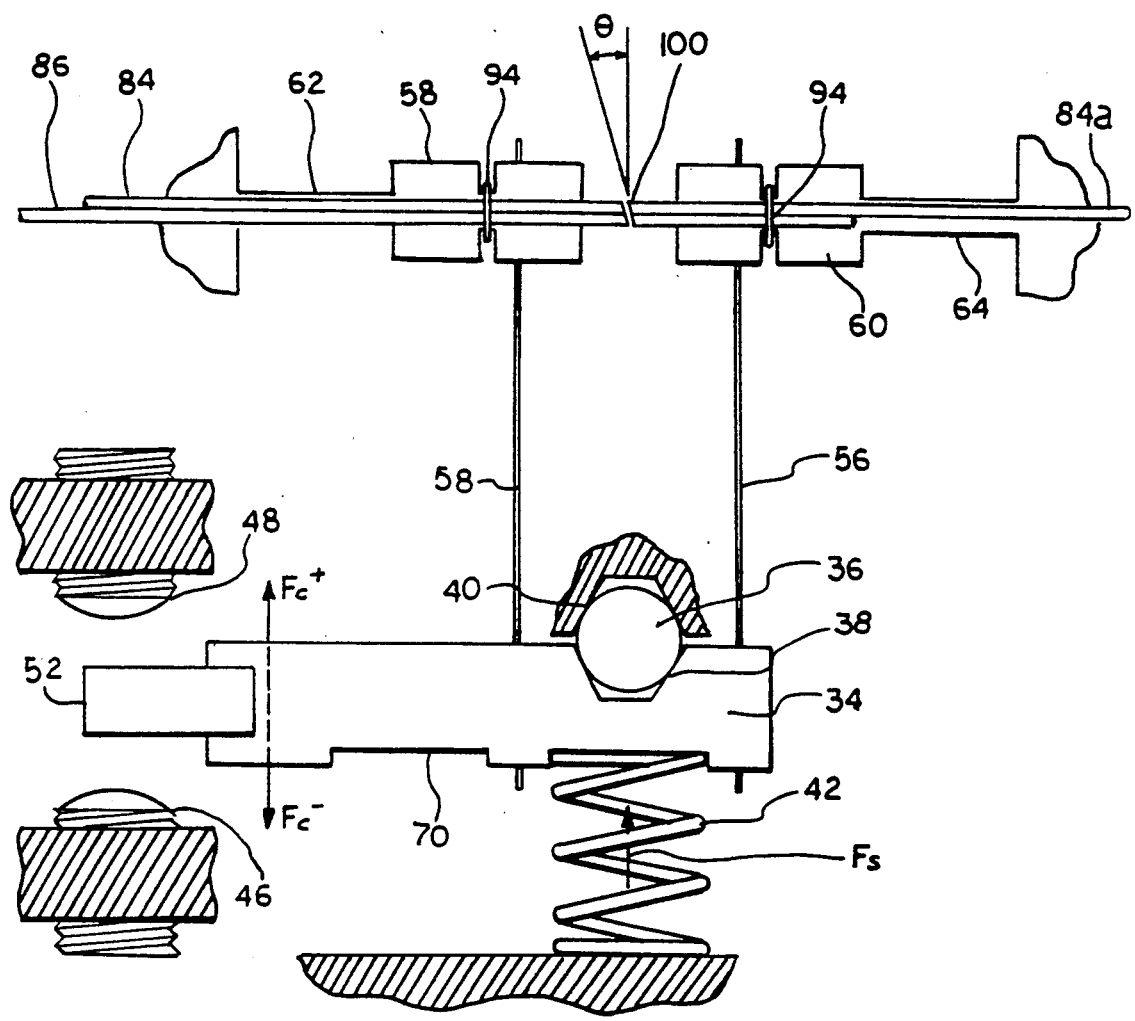
FIG. 4 is a top plan view of certain items of FIG. 1, to a larger scale, for clarity.

To reduce back reflection of the light within the fiber, the gap can be at a slight angle $\theta$, for example up to about 16°. This can be seen more clearly in FIG. 4, which shows the more important details to a larger scale. To the minimum the angled surfaces should at least include the fiber core, or cores. FIG. 4 is diagrammatic only and does not conform exactly to FIGS. 1, 2 and 3, but corresponding reference numerals are used where applicable. In FIG. 4, the spring 42 is in a neutral position, as in FIG. 2, but can be positioned to bias the pivot member 34 by being p;aced at the alternate position 70.

An alternative to angling the gap is to form AR (anti-reflection) coatings on the fiber end surfaces, or to use index matching fluid to fill the gap.

When positioning the fibers, the coating is removed, including any buffer layer. The fibers are positioned and inverted U-shaped members 94 pushed over the fibers. The U-shaped members both pull the fibers together and hold them down on the support members. The adhesive is then applied, followed, after curing, by cutting of the gap.

After the gap has been formed, the cover can be applied, as by adhesive or mechanical means. The provision of differentiated movement by the rods 54, 56 minimizes temperature variation effects on the rods. The switch as a whole is very temperature insensitive.

Preferably, the bottom 14 is of magnetic material, to enhance the magnetic field of the magnets, but is not essential. In another alternative the bottom could have a magnetic material insert, or could have a magnetic coating or layer.

It is not essential that a cover 12 be provided, with magnets 30. If a cover is provided, with magnets, preferably it would be of magnetic material, have a magnetic insert, or a magnetic coating or layer, but again this is not essential, but enhances the magnetic field. Without the upper magnets 30, a higher operating voltage is required. This also applies, should a cover be provided with the upper magnets 30, but lower magnets 28 omitted.

The relatively long lever action, from the pivotal axis of the pivot 36 to the screw abutments 46, 48, relative to the short distance from the pivotal axis to the rods 54, 56 provides for very easy and very accurate fine adjustment of the portions of the fiber support members 58 and 60. Normally adjustment of the position of fibers in various structuring is close to the ends of the fibers. This makes fine adjustment extremely difficult, if not impossible, as very fine adjustments are necessary, particularly for single mode fibers. The arrangement as illustrated in FIGS. 1, 2 and 3, avoids the need for very fine adjustments at the adjustable screw stops 46 and 48. Also, with such an arrangement, repeatability is very high.

The fibers being mounted and fastened to the support members provides for movement of the fibers with no angular displacement of one fiber relative to the other.

A switch in accordance with the invention can be a single on/off switch with only one fiber extending across the housing and cut to form the gap. In such an arrangement movement may be reduced as it is sufficient to move the fibers only such that the light transmitting cores are non-aligned. In the arrangement as in FIG. 1, 2 and 3, the movement is such that one fiber is moved from core alignment with one fiber to core alignment with another fiber.

It is possible that sufficient movement can be obtained by moving only one support member. Thus, for example, rod 54 could be omitted, only rod 56 provided and only support member 60 moved. Support member 58 could be solid with the central member 16, without a flexible section 62. The reverse can apply, rod 56 omitted and rod 54 provided.

Thus the invention provides a moving fiber optical switch in which the initial positioning of the fibers is very easy with no high level of accuracy in handling and positioning of the fibers. This makes the match particularly applicable to single mode fibers, with their very small cores. The accuracy provided also avoids the use of lenses and other items to offset alignment problems. As an example, for a single mode optical fiber, a switch can be provided, with a gap at an angle of about 8°, with a gap length of about 25 microns, having a 1 dB loss.

What is claimed is:

1. A moving fiber optical fiber switch, comprising:
   two opposed fiber support members spaced apart along a fiber axis, one of said support members flexibly mounted for movement normal to said fiber axis;
   at least one optical fiber extending across said support members substantially parallel to said fiber axis, said fiber having closely spaced axially aligned opposed end surfaces forming a gap produced by cutting said fiber;
   a pivotally mounted member mounted for rotation about a pivot axis spaced from and aligned with said gap;
   means extending from said pivotally mounted member to said flexibly mounted support member to move said flexibly mounted support member relative to said other support member;
   a lever extending from said pivotally mounted member and having a free end, and an electrical coil mounted on and attached to said lever;
   magnet means mounted on at least one side of said coil, and electrical connections to said coil for providing electrical power to said coil;
   adjustable stop means on opposite sides of said free end of said lever;
   the distance from said stop means to said pivot axis being longer than the distance from said pivot axis to said means extending from said pivotally mounted member;
   the arrangement such that on applying power to said coil, said coil and lever pivot about said pivot axis one way or the other depending upon polarity of said electrical power to said coil, moving said flexibly mounted support member laterally relative to the other support member to move one of said end surfaces laterally relative to the other of said end surfaces to perform a switching action.

2. A switch as claimed in claim 1, both of said fiber support members flexibly mounted for relative movement normal to said axis and including means extending from said pivotally mounted member to each support member for movement thereof.

3. A switch as claimed in claim 2, said means extending from said pivotally mounted member comprising two members extending one on each side of said pivot axis, whereby on pivoting of said pivotally mounted member one support member is pushed and one support member is pulled to provide said relative movement.

4. A switch as claimed in claim 1, including resilient compression means acting on said pivotally mounted member remote from said gap.

5. A switch as claimed in claim 4, said compression means acting on said pivotally mounted member in alignment with said pivot axis.

6. A switch as claimed in claim 4, said compression means acting on said pivotally mounted member along an axis offset from said pivot axis in a direction parallel to said fiber axis.

7. A switch as claimed in claim 1, said gap at an angle to said fiber axis.

8. A switch as claimed in claim 7, said angle up to about 16° relative to a plane normal to said fiber axis.

9. A switch as claimed in claim 1, said lever including an end portion of magnetic material.

10. A switch as claimed in claim 1, said adjustable stop means comprising a screw member on either side of said free end of said lever, said screws adjustable to control the pivotal movement limits of said lever and said pivotally mounted member.

11. A switch as claimed in claim 1, comprising two optical fibers positioned side-by-side on said support members, each fiber having closely spaced opposed end surfaces forming a gap produced by cutting said fibers.

12. A switch as claimed in claim 1, including a hollow housing having side walls and end walls, and a bottom and a top, a central member extending into the housing at one end of said housing, said fiber support members mounted on said central member, said magnet means including lower magnets mounted on said bottom at the other end of said housing.

13. A switch as claimed in claim 12, said pivot axis comprising a pivot mounted between a pivot formation on said central member and a pivot formation on said pivot member.

14. A switch as claimed in claim 13, including resilient compression means positioned between said pivotally mounted member and a side wall of said housing.

15. A switch as claimed in claim 14, said resilient compression means acting on said pivotally mounted member in alignment with said pivot axis.

16. A method of making a moving fiber optical fiber switch, comprising:
   providing two opposed fiber support members spaced apart along a fiber axis, with at least one support member flexibly mounted for movement normal to said fiber axis, said members having support surfaces in a common plane;
   positioning at least one fiber on said support surfaces parallel to said fiber axis;
   mounting a pivotal member for pivotal movement about a pivot axis spaced from said fiber axis and normal thereto, said pivotal member having a lever extending therefrom extending in the direction of said fiber axis;

positioning means between said pivotal member and said at least one flexibly mounted support member for movement of said flexibly mounted support member by pivoting of said pivotal member;

positioning a coil on said lever and magnet means on at least one side of said coil, whereby on applying power to said coil said lever and said pivotal member pivot about said pivot axis;

and cutting across said fiber to form a gap, and said fiber having opposed end surfaces.

17. A method as claimed in claim 16, including cutting said fiber at an angle.

18. A method as claimed in claim 16, including positioning two fibers side-by-side on said support members, and cutting both fibers to provide a common gap.

19. A method as claimed in claim 16, including flexibly mounting both of said support members.

* * * * *